(12) United States Patent
Scaman et al.

(10) Patent No.: US 7,250,945 B1
(45) Date of Patent: Jul. 31, 2007

(54) THREE DIMENSIONAL WEATHER FORECAST RENDERING

(75) Inventors: Thomas S. Scaman, Chanhassen, MN (US); Mark Quadling, Plano, TX (US); Henley Quadling, Plano, TX (US)

(73) Assignee: ScapeWare3d, LLC, Chanhassen, MN (US)

(*) Notice: Subject to any disclaimer, the term of this patent is extended or adjusted under 35 U.S.C. 154(b) by 848 days.

(21) Appl. No.: 10/238,033

(22) Filed: Sep. 9, 2002

Related U.S. Application Data

(60) Provisional application No. 60/318,072, filed on Sep. 7, 2001.

(51) Int. Cl.
*G06T 17/00* (2006.01)

(52) U.S. Cl. .................................................. 345/420

(58) Field of Classification Search ............... None
See application file for complete search history.

(56) References Cited

U.S. PATENT DOCUMENTS

| | | | | |
|---|---|---|---|---|
| 4,694,407 A | * | 9/1987 | Ogden | 345/441 |
| 5,379,215 A | | 1/1995 | Kruhoeffer et al. | |
| 5,583,972 A | * | 12/1996 | Miller | 345/419 |
| 5,796,407 A | * | 8/1998 | Rebiai et al. | 345/586 |
| 5,999,882 A | | 12/1999 | Simpson et al. | |
| 6,335,765 B1 | | 1/2002 | Daly et al. | |
| 6,496,780 B1 | * | 12/2002 | Harris et al. | 702/3 |
| 6,856,323 B2 | * | 2/2005 | Moore | 345/629 |
| 6,961,061 B1 | | 11/2005 | Johnson et al. | |

OTHER PUBLICATIONS

AWA-TV. Weather Forecast Now Product Literature, Apr. 1999. Los Vegas. Nevada.

* cited by examiner

*Primary Examiner*—Mark Zimmerman
*Assistant Examiner*—Andrew Yang
(74) *Attorney, Agent, or Firm*—Reinhart Boerner Van Deuren s.c.

(57) ABSTRACT

A system and method for generating a realistic visual representation of forecast weather conditions. A "future time-lapse" video image of weather conditions effecting a given area may be generated automatically from a meteorologist's weather forecast. The resulting presentation may include a photo-realistic terrain background, an image of a landmark, such as a cityscape familiar to users, realistic three-dimensional cloud images, as well as informative textual and/or graphical overlays. Realistic fractal cloud images may be generated in an efficient manner by combining a plurality of slices taken through a spherical solid fractal texture to create three-dimensional cloud images.

36 Claims, 7 Drawing Sheets

CREATING SLICES

3D FRACTAL SPHERE

2D FRACTAL SLICES PULLED OUT OF SPHERE
S(1), S(2), ...., S(n)

PERPENDICULAR 2D FRACTAL SLICES

CREATE VOLUME

DIRECTION OF VIEWING

ASSEMBLY OF VOLUME CLOUDLET

THREE DIMENSIONAL WEATHER FORECAST RENDERING

This application claims the benefit of U.S. Provisional Application No. 60/318,072, filed Sep. 7, 2001.

FIELD OF THE INVENTION

The present invention pertains generally to systems and methods for preparing presentations of forecast weather conditions, and more particularly to systems and methods for generating graphical representations of forecast weather conditions including computer generated fractal cloud images.

BACKGROUND OF THE INVENTION

Modern televised weather reports incorporate computer generated graphical information in combination with video segments and live presenters to provide weather reports which are both informative and entertaining. Such reports typically are prepared by a meteorologist or other technician based upon weather information provided from a variety of weather information sources. Computer based production equipment is employed for generating graphical displays of weather information and for combining the graphical displays with video segments to provide the entire weather report presentation.

Computer-based systems, including detailed computerized geographic maps, and other graphics generating capabilities, may be employed to combine the information provided from various weather information sources and forecast models into an integrated weather report. Computer-generated graphics often are combined with live presenters and/or live or recorded video segments to provide a complete weather presentation to a viewer as part of a televised weather report. For example, such a presentation may include live video of current weather conditions or recorded video segments of weather conditions occurring during the day for which the weather report is provided.

Video segments of past and current weather conditions employed as part of a televised weather presentation may include time-lapsed photography video presentations. For example, a video camera may be positioned to take a video image of the sky conditions evolving throughout a day or other time period of interest (e.g., taken near a landmark which would be recognized by viewers of the weather presentation). The video camera may be computer controlled to take frames of video images at spaced apart time intervals throughout the time period of interest. When the time-lapsed video created in this manner is played back at normal speed, a sped-up video image of the evolving sky conditions is presented. Using time-lapsed photography in this manner, a televised weather report may present a dramatic video summary of evolving sky conditions throughout an entire day with a video segment running only a few seconds.

Forecasts of future weather conditions for a location typically are provided as part of a weather presentation using a relatively simple graphical and textual presentation format. For example, future weather conditions are often presented using a simple graphical presentation format showing a time-line of future time periods with high and/or low temperatures and a graphical indication of general sky conditions for those time periods indicated thereon. Such a presentation may include a computer generated graphic illustration of a sun, if the forecast sky conditions are sunny, clouds, if the forecast sky conditions are cloudy, rain and lightening, if thunderstorms are predicted, etc. Such sky condition graphics and forecast high/low temperatures may be overlaid on a map display, thereby allowing forecast sky conditions and temperatures for a given time period to be presented simultaneously for various locations throughout a region.

Although such relatively simple presentations of future forecast weather conditions are typically clear, accurate, and easily understandable, such simple presentations are not very dramatic or memorable. What is desired, therefore, is a system and method for generating a presentation of future forecast weather conditions which conveys more dramatically to viewers thereof the weather conditions they are likely to experience in the future. Such a system and method should be easily employed by meteorologists or other technicians to generate quickly dramatic forecast weather presentations based on available weather forecast data.

A fractal is a geometrically complex object, the complexity of which arises through the repetition of form over some range of scale. Fractal complexity is the repetition of the same thing over and over again, at different scales, as opposed to non-fractal complexity, which is the accumulation of a variety of distinct and unrelated events over time. For example, trees describe an approximate fractal pattern, as the trunk divides into branches that further subdivide into smaller branches that ultimately subdivide into twigs; at each stage of the division the pattern is a smaller version of the original. Fractals are relevant to any system involving self-similarity repeated on diminishing scales Fractals are used in computer graphics generation. For example fractal techniques have been used to render computer generated graphical images of naturally occurring objects or structures which follow a fractal pattern. In such fractal based computer graphics generation techniques there typically is a basic computer implemented graphics generating operation that is performed, and basically the same operation is performed over and over again, at smaller and smaller scales. At the completion of the computer graphics generation process, you end up with something that looks like a complex structure that one might observe in nature. Furthermore, the resulting image can have infinite detail, because as one zooms in, you can just keep on doing the repetitious fractal operation over and over again to achieve the desired detail. Thus, a computer generated fractal object appears complex, and infinitely detailed. But the operation to create such an object is a simply a repetition of the same basic operation. You stop when you have enough detail. And for computer graphics, the size of the pixels impose an ultimate limit on the operation.

Fractal techniques have been used to generate computer generated graphical cloud images. True volumetric fractal cloud images have been known for a number of years. These known fractal cloud images, and the techniques for generating them, are very complex. Such known fractal cloud images have been "slowly" rendered only on very expensive Silicon Graphics super computers running UNIX operating systems.

What is desired, therefore, is a system and method which enables fractal cloud images to be displayed in real-time on any modest personal computer using a standard operating system.

SUMMARY OF THE INVENTION

The present invention provides a system and method for three-dimensional weather forecast rendering. In accordance with the present invention, a meteorologist or other user may easily and rapidly generate a realistic representation of forecast weather conditions. The present invention may be implemented as a computer program or programs running on a conventional personal computer system, such as a custom assembled networked Windows NT/2000 workstation. Generally, data input into the system can include regional high-resolution ground satellite imagery, the meteorologist's forecast, and other information such as the latitude and longitude, required for completely realistic simulations of the movements of the Sun, Moon and Planets, as well as the celestial sphere, including the constellations in the night sky. The minimum information that is required before each broadcast is the meteorologist's forecast, which is input in a format that he or she is likely already using. Additional information in the form of text banners and graphics can be added as a final step. The meteorologist can also control the time-line of the animation, and the camera or view-point, in a completely configurable dynamic manner. The end result will be a "future time-lapse" of the weather over a specific three-dimensional area with simulated clouds and cloud types along with expected precipitation. The three-dimensional scene will be generated in layers, using the user supplied input data, as well as access to other databases, such as satellite imagery and locations of celestial objects.

Simulated clouds that may be incorporated into a presentation of forecast weather conditions in accordance with the present invention preferably include realistic cloud images rendered using fractal computer graphics generation techniques. An improved and preferred method for generating realistic fractal cloud images in accordance with the present invention incorporates four basic steps.

Step 1: Build a perfectly spherical three-dimensional solid fractal texture using conventional fractal image computer graphics generation techniques. This is done only once per visualization.

Step 2: Extract a large number of thin slices through the spherical solid fractal texture. Adjacent slices look similar because local variation is low. Call these $S(1), S(2), \ldots, S(n)$ Step 3: Build up a volume "cloudlet" as an assembly of these slices, where the slices are constrained always to be perpendicular to the direction of viewing. For example, a particular cloud could be made up of $S(12)$, $S(43)$ and $S(100)$. By changing the slices used to $S(13)$, $S(44)$ and $S(101)$ in a subsequent frame, the slices are similar but different and that visually looks like dynamic changes that make clouds look the way they do. After this step we have a series of cloudlets $C(1), C(2), \ldots C(N)$. Also, each cloudlet can change over time, by simply changing the offset of the particular slice $S(i+\text{offset modulo } n)$ where i goes from 0 to n. Depending on the type of cloud, the cloudlets can vary from flat to spherical.

Step 4: Assemble cloudlets into clouds, depending on the type of cloud. Conventional alpha blending may be used to combine all these components together.

Further objects, features, and advantages of the present invention will be apparent from the following detailed description taken in conjunction with the accompanying drawings.

DETAILED DESCRIPTION OF THE INVENTION

The present invention provides a system and method for generating a realistic representation of forecast weather conditions. A system and method in accordance with the present invention is easily employed by a meteorologist or other operator to generate such a presentation for broadcast as part of a televised weather report or for other applications. The present invention may be implemented in software on a conventional computer system. A computer system having a software program implemented thereon to generate a realistic representation of weather forecast conditions in accordance with the present invention may be referred to as a Visual Forecast workstation.

A suitable computing environment 30 in which the present invention may be implemented now will be described briefly with reference to the schematic block diagram of FIG. 1. Although not required, the present invention will be described, at least in part, in the general context of computer-executable instructions, such as program modules, being executed by the computer 30. Generally, program modules include routine programs, objects, components, data structures, etc., which perform particular tasks or implement particular abstract data types. Tasks performed by the program modules are described herein and with the aid of diagrams and flowcharts. Those skilled in the art can implement the description, diagrams and flowcharts to computer-executable instructions. In addition, those skilled in the art will appreciate that the invention may be practiced with other computer system configurations, including multi-processor systems, networked personal computers, mini-computers, main frame computers, and the like. The invention may also be practiced in distributed computing environments where tasks are performed by remote processing devices that are linked through a communications network. In a distributed computer environment, program modules and/or data may be located in both local and remote memory storage devices.

Figure 1:
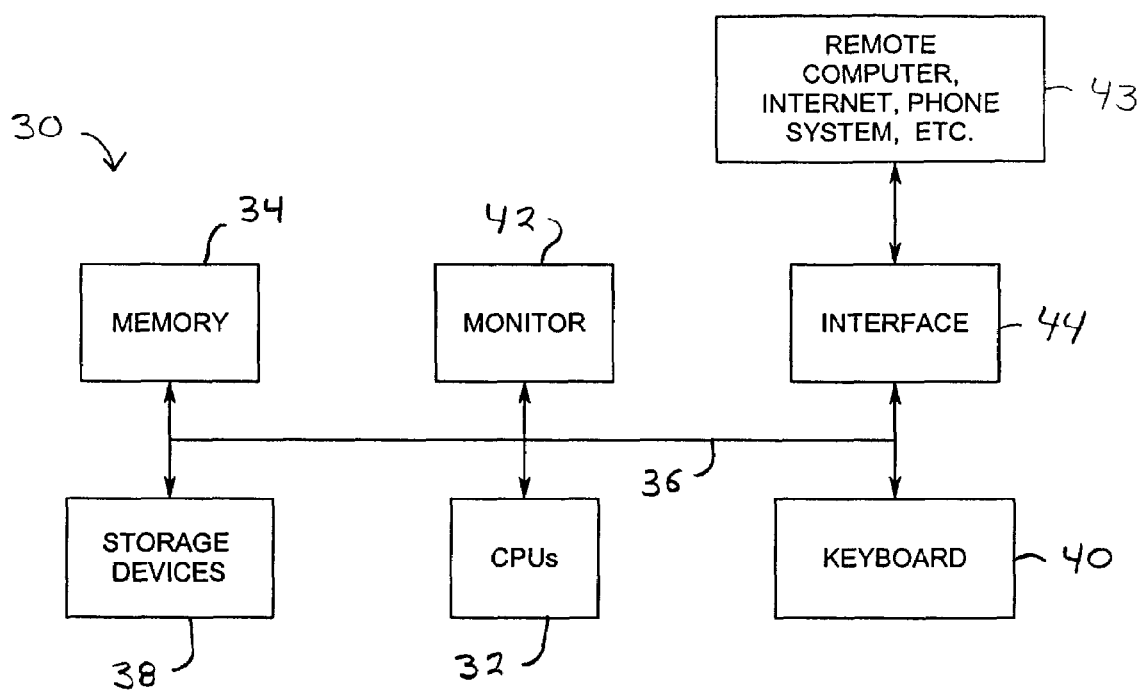
FIG. 1 is a schematic block diagram of an exemplary computer system for implementing a three-dimensional weather forecast rendering system and method in accordance with the present invention.

The computer 30 illustrated in FIG. 1 comprises a conventional computer having one or more processing units (CPUs) 32, memory 34, and a system bus 36, which couples various system components, including the memory 34 to the CPUs 32. The system bus 36 may be any of several types of bus structures, including a memory bus or a memory controller, a peripheral bus, a network bus and a local bus using any of a variety of bus architectures. The memory 34 includes read only memory (ROM) and random access memory (RAM). A basic input/output (BIOS) containing the basic routine that helps to transfer information between elements within the computer 30, such as during start-up, is stored in ROM. Storage devices 38, such as a hard disk, a floppy disk drive, an optical disk drive, etc., are coupled to the system bus 36 and are used for storage of program modules and data. It should be appreciated by those skilled in the art that other types of computer readable media that are accessible by a computer, such as magnetic cassettes, flash memory cards, CD-ROM, digital video disks, random access memories, read only memories, and the like, may also be used as storage devices. Commonly, programs are loaded into memory 34 from at least one of the storage devices 38 with or without accompanying data.

An input device 40 such as a keyboard, pointing device (mouse), or the like, allows an operator to provide commands to the computer 30. A monitor 42 or other type of output device is further connected to the system bus 36 via a suitable interface and provides feedback including the animated forecast rendering to the operator. Computer 30 can communicate to other computers, or a network of computers (generally designated at 43), such as the Internet through a wired or wireless communications link, and an interface 44, such as a modem, network card, or the like. In one embodiment, computer 30 can organize, present and solicit information to and from a customer through a "Website" commonly used on the Internet. In such a situation, the computer 30 is identified as a server, while remote computers are identified as clients. Remote customers can access the Website using a conventional desktop computer or other Internet device and a browser, such as MICROSOFT INTERNET EXPLORER or NETSCAPE NAVIGATOR.

An exemplary computer system on which a three dimensional weather forecast rendering system and method in accordance with the present invention may be implemented may comprise a Windows NT/2000 workstation, with large memory resources (e.g., 1 G RAM), Dual Pentium 4 (or the fastest widely available Intel CPU at the time) CPUs, together with a fast 3D graphics accelerator (geared towards OpenGL and large textured polygon count), with large onboard memory, including substantial texture memory. Care should be taken to select quality components, such as the most advanced motherboards available on the market at the time, geared for intensive computation. A fast network card is also required, if internet/networking functions are desired. Fast large SCSI hard drives may also be used. Note that if a personal computer of sufficient capability (as just described) is employed, larger computers, e.g., supercomputers running a UNIX or other main frame operating system, will not be required to implement the present invention, including the fractal cloud image generation technique to be described in more detail below.

Figure 2:
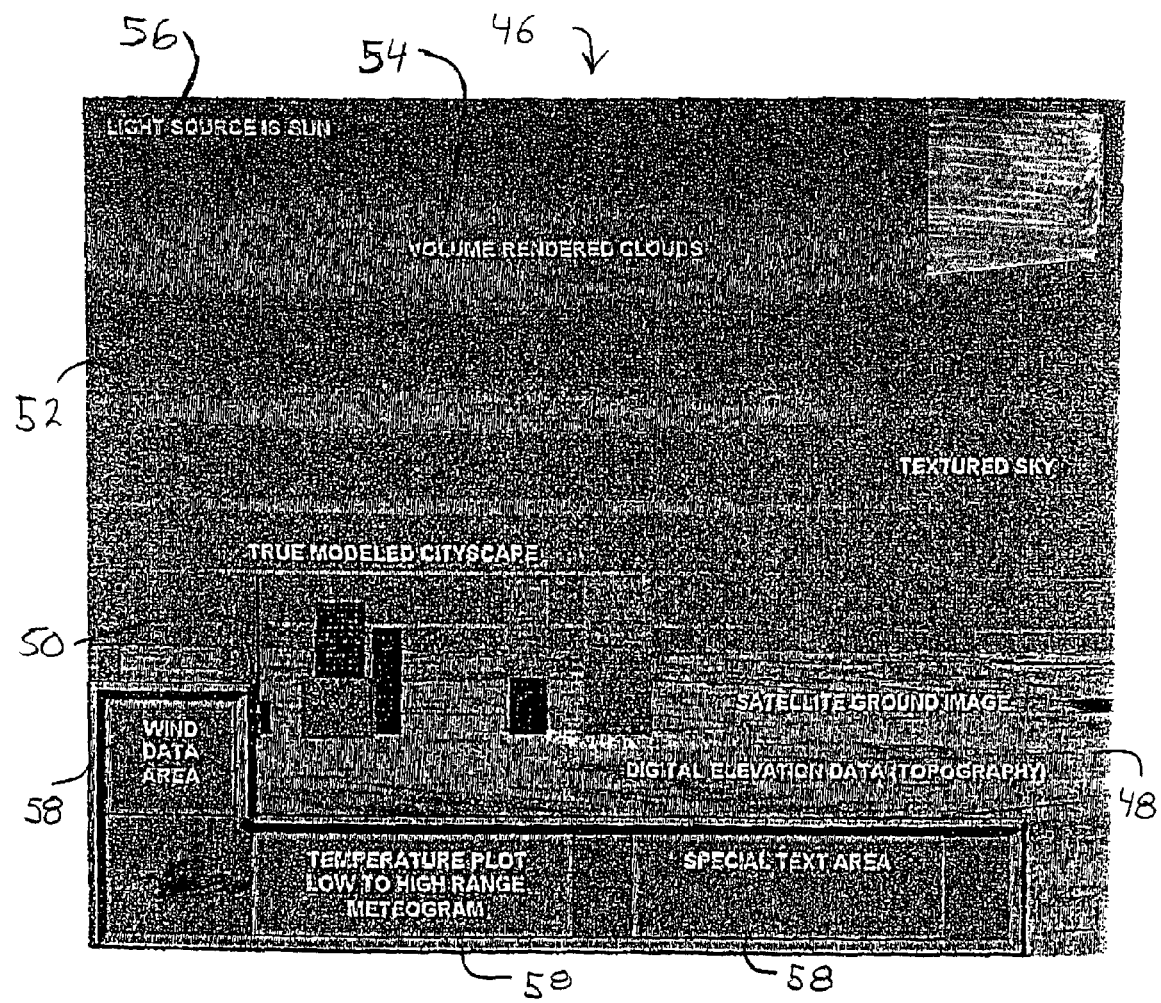
FIG. 2 is an exemplary still frame of an exemplary "future time-lapse" presentation of forecast weather conditions that may be generated using three-dimensional weather forecast rendering in accordance with the present invention.

An exemplary weather presentation generated in accordance with the present invention is illustrated at 46 in FIG. 2. FIG. 2 illustrates an exemplary single frame 46 of a dynamic "future time-lapse" weather presentation that may be generated in accordance with the present invention. As illustrated, a weather presentation generated using three-dimensional weather forecast rendering in accordance with the present invention may include photo-realistic background terrain 48, realistic landmarks 50 recognizable to viewers of the presentation (such as a cityscape skyline), and a realistic sky image 52 showing forecast weather conditions for the area shown in the presentation 46. For example, the realistic sky image 52 may include realistic cloud representations 54 showing the cloud conditions that are forecast for the area. Other atmospheric effects, such as rain, snow, fog or other precipitation may be represented in the presentation as well, if such conditions are forecast for the time and area represented in the presentation 46. A simulated light source 56, such as the sun or moon, provides a degree of illumination for the scene which indicates both the time (day or night) of the presentation and the passage of time as the position of the light source changes as the entire scene is animated. Finally, various static or dynamic text, logos, or other animated graphics 58 may be overlaid on the dynamic presentation 46 to provide additional information to viewers thereof.

Figure 3:
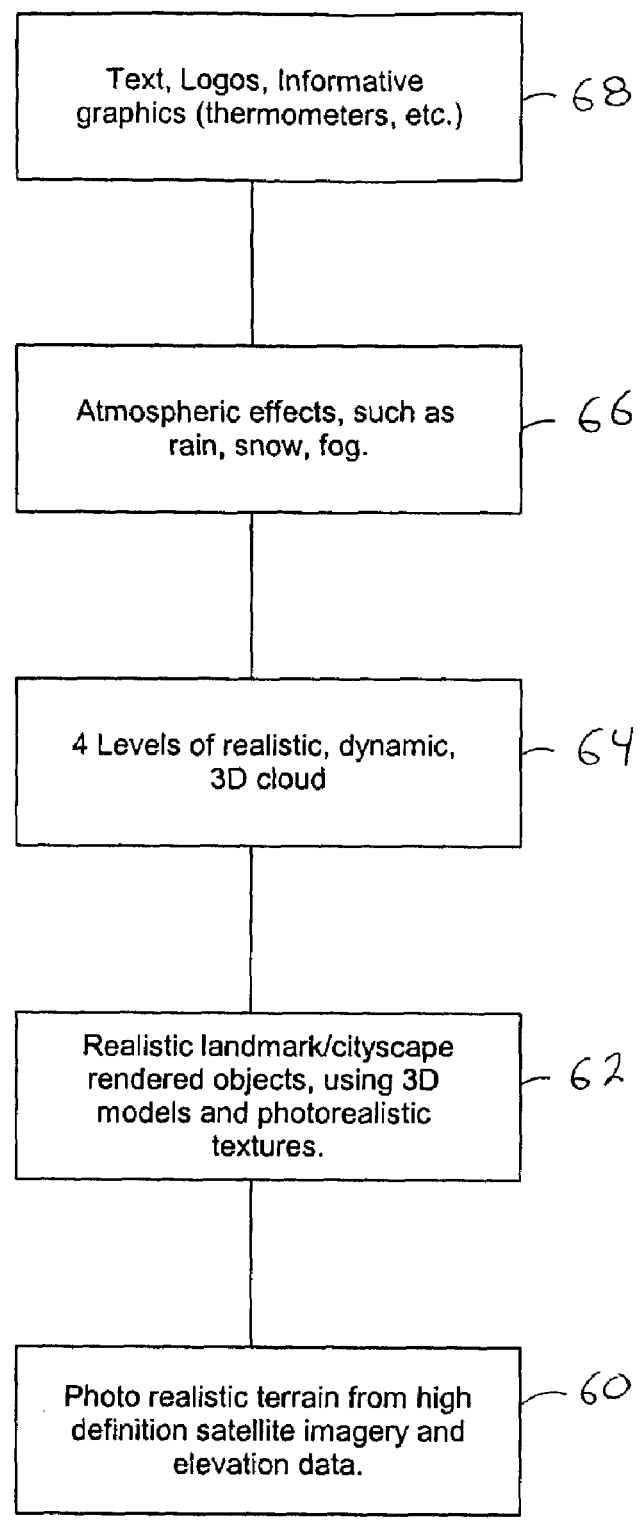
FIG. 3 is a block diagram showing the relationship between the image layers used to generate an exemplary presentation of forecast weather conditions using three-dimensional weather forecast rendering in accordance with the present invention.

A dynamic three dimensional weather forecast scene rendered in accordance with the present invention may be generated in layers, using user supplied input data, as well as access to other databases, such as satellite imagery and locations of celestial objects. An exemplary relationship between the image layers which may be used to form a weather presentation in accordance with the present invention is illustrated by the block diagram of FIG. 3. A photo-realistic background terrain image layer 60 may be generated from available high definition satellite or other imagery data that is overlaid on available elevation data for the area represented in the presentation image to be generated. A landmark/cityscape image layer 62 may be generated by rendering realistic images of the objects to be displayed in the layer using three-dimensional models and photo-realistic textures. A cloud image layer 64 may include up to four or more levels of realistic three-dimensional cloud images, representing the actual forecast cloud conditions for the area being represented. A preferred and improved method for generating such realistic cloud images will be described in detail below. An atmospheric effects image layer 66 may include animated representations of precipitation such as rain or snow or other atmospheric effects such as fog. A final text/graphics overlay layer 68 may include informative text, logos, and other graphical information overlaid on top of the animated image provided by the combination of the underlying layers. The text/graphics overlay layer may include static and/or dynamic elements which may be animated in coordination with the underlying "future time-lapse" presentation. For example, an animated thermometer may show changing forecast temperatures or an animated wind vane may show changing forecast wind directions for the time period and place represented by the underlying presentation.

Figure 4:
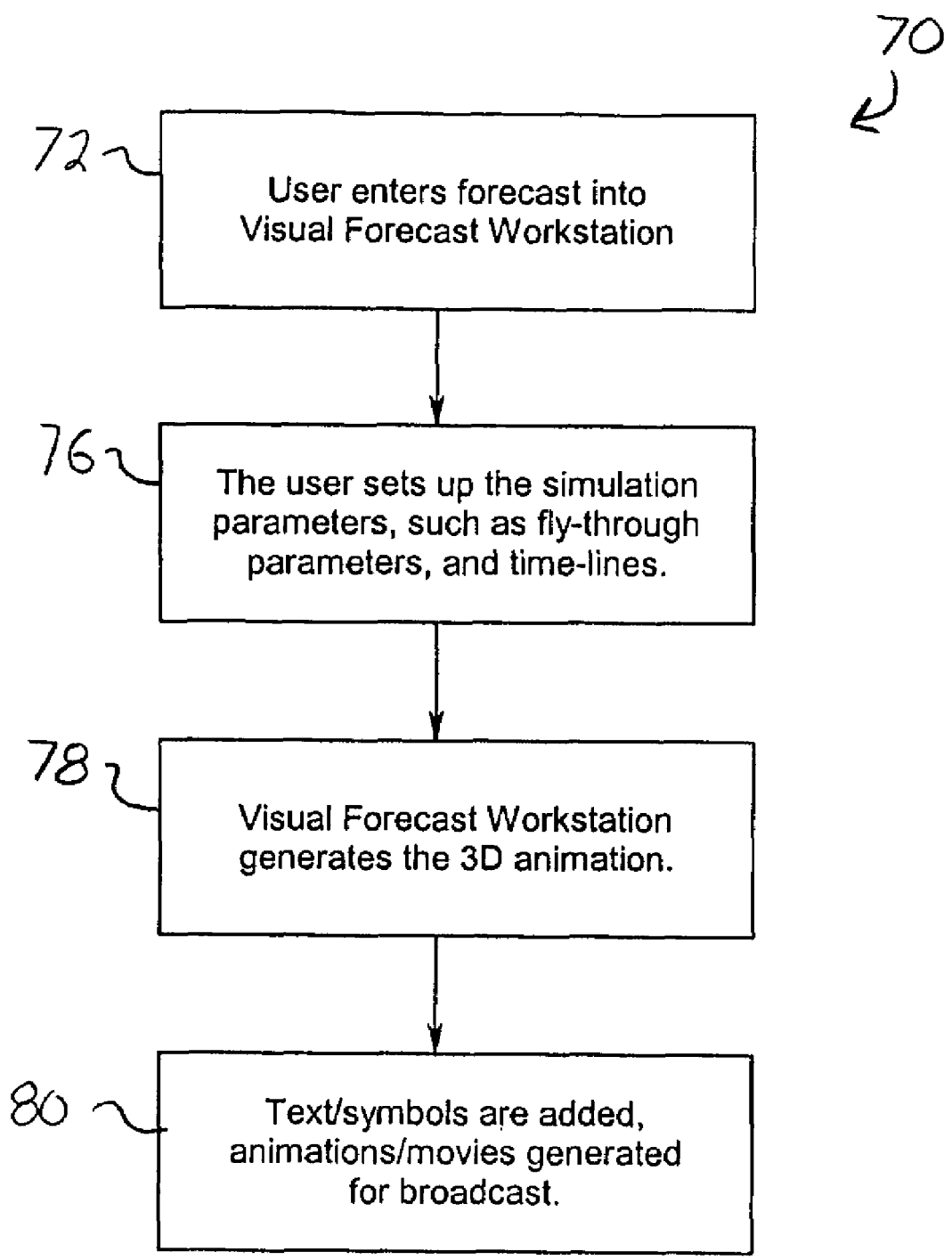
FIG. 4 is a flow chart diagram illustrating exemplary steps in a process for generating a presentation of forecast weather conditions using three-dimensional weather forecast rendering in accordance with the present invention.

An exemplary procedure 70 for generating a three dimensional weather forecast presentation in accordance with the present invention will now be described in more detail with reference to the flow chart diagram of FIG. 4.

Figure 5:
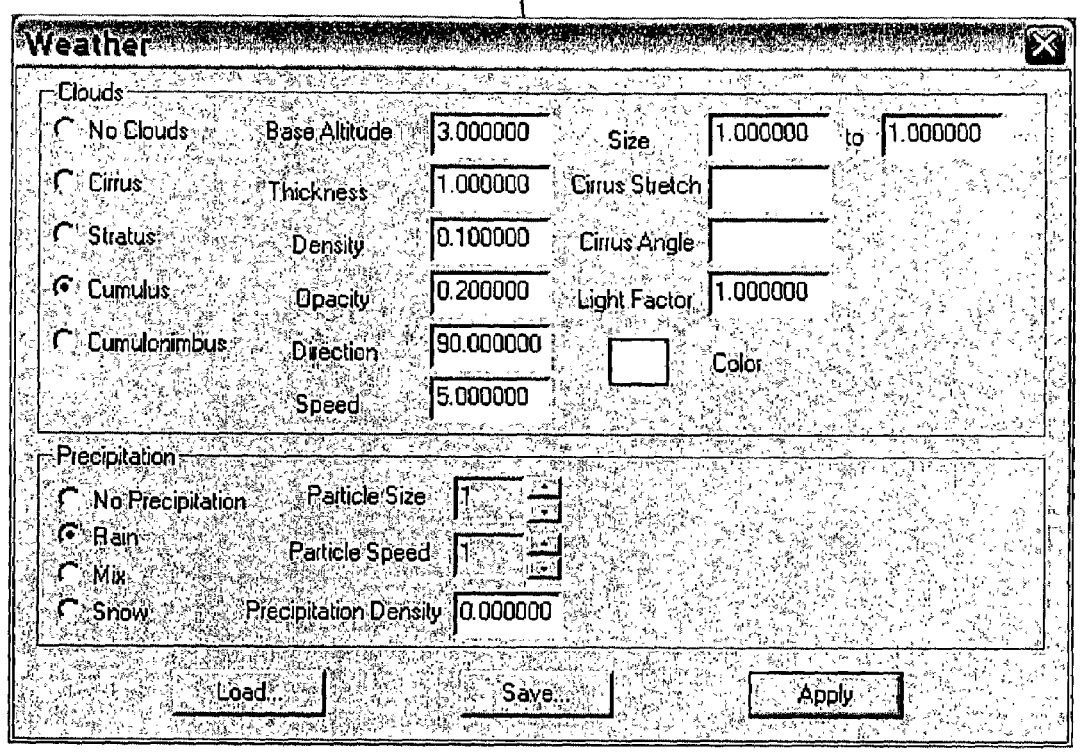
FIG. 5 is an exemplary graphical user interface that may be provided to a user of a system for generating a presentation of forecast weather conditions using three dimensional weather forecast rendering in accordance with the present invention and which allows the user to enter into the system a weather forecast upon which the presentation of forecast weather conditions will be based.

The procedure may begin at step 72 with a meteorologist or other user entering a forecast into the system. This forecast information is very similar to what is currently displayed in TV weather forecasts (currently, text and animated gifts to convey the forecast in general terms). An exemplary graphical user interface 74, which may be provided by the system, e.g., on the system monitor 42, to facilitate the entry of forecast information into the system, is illustrated in FIG. 5. The user may enter forecast information into the system by interacting with the graphical user interface using conventional computer system input devices, such as the keyboard 40 and a mouse. Dialog boxes can be provided in the graphical user interface for each of the various weather forecast parameters. (Dialog boxes for forecast parameters different from and/or in addition to those illustrated by example in FIG. 5 may be provided in the graphical user interface.) In another embodiment, software may be provided to convert word parameters (e.g., broken, scattered, etc.) into values that can be interpreted by the software program. The meteorologist or forecaster may input his or her forecast into the Visual Forecast workstation by choosing cloud types, cloud amounts (scattered, broken, overcast or clear, renderings of which are stored in memory) and cloud altitude for specific time periods, e.g., over the next two to three days. In addition, the forecaster may program in precipitation type (showers, thunderstorms, snow, sleet, freezing rain, renderings of which are stored in memory) along with low and high temperatures and wind speeds.

In another embodiment, rather than having a weather forecast entered manually by a meteorologist or other user, weather forecast content may be imported from other sources (such as model data). Alternatively, a hybrid method where some weather forecast content is dynamically entered and some content is from model data may be employed.

The meteorologist or other user may then be allowed by the system at step 76 to set up various simulation parameters, such as fly-through parameters and time lines. For example, the user may specify a start time and an end time for the animation to be generated by the system.

A realistic graphical representation of forecast weather conditions then may be generated automatically by the system at step 78. To generate a realistic graphical representation of forecast weather conditions in accordance with the present invention, a real model preferably is used for the three-dimensional world. That is, a real sphere of the correct size is used for the earth, orbiting around a real sun, and with a real moon as a satellite. Clouds forming part of the presentation, if indicated by the forecast weather conditions being represented, preferably are real three-dimensional distributions of opaque material of the correct size, and situated at a realistic altitude above the earth's surface. (A preferred fractal technique for generating such cloud images will be described in more detail below.) The represented cloud images preferably can change over time, and move along the curve of the earth (displaced by their height).

The earth surface may obtained from topography data that has real surface height variation, and is draped (associated) with real satellite imagery. For example, photo-realistic terrain may be built upon Digital Elevation Topographical data from the United States Geological Survey. The wired topography is draped (or covered) with a satellite photograph of the ground. Such imagery may be obtained from Space Imaging, Inc., or other companies that provide high resolution ground imagery. On average this ground imagery is one meter resolution. However, aerial ground photograph companies now are providing resolution down to one foot, which also might be used. A three-dimensional modeled cityscape or other landmark is constructed on top of the satellite picture to provide viewers with a point of reference.

Both the day and night sky preferably are implemented as textured images. The sun moving across the sky may be used as the true light source. Thus, in the animated image, shadows may get cast from a building opposite the sun. The clouds then flow across the screen as per what the user inputs.

In accordance with the present invention, a screen visualization may be generated by taking this real model information and creating a two-dimensional representation from the particular viewpoint of a virtual camera or viewer. The virtual camera is modeled as a real lens, with a configurable focal length, position and direction. The focal length parameter can be used to specify normal, telephoto or fisheye type visualization. A conventional three-dimensional rendering engine, such as OpenGL, which is built into the Windows operating system, may be used to implement this virtual camera. Open GL is very good for rendering surface models that are textured. Algorithms are used for taking the three dimensional real world that has been defined along with volume based objects, and converts it into textured surface models that can be rapidly rendered using OpenGL. For example, as will be described in more detail below, clouds may be represented as real three-dimensional volumes of density distributions. In a preferred embodiment, real time rendering (or substantially real time) is desired. However, a volume rendering in real time is difficult, so the volume model may be converted into a two-dimensional surface model (or collection of surface models) in a way that looks the same from the camera perspective.

The sky may be modeled as a textured object centered at the camera location. The sun and moon locations are computed based on their actual movements relative to the earth, and are also modeled as textured objects. The lighting of the scene may be based on the location of the sun relative to camera position, just as in real life. Precipitation may be rendered in a similar fashion to clouds: i.e., a volume distribution of rain particles which equivalently describe a textured three-dimensional surface (from the camera position), and which can then be rendered rapidly using Open GL. The exact geographical location of the system is already known, as well as the time and date, so that the generation of the ground topography as well as the realistic movements of the celestial objects can be determined and rendered as a function of geographical location (longitude, latitude), time of day, and viewing position of the scene. The database for the rendering of the cityscape and/or landmarks in the scene may be stored in the system, and need only be modified (or updated) if desired by the advanced user.

The Visual Forecast workstation may at step 80 then overlay textual and/or graphical information on the generated scene and output the entire forecast in simulated visual form over the three-dimensional landscape and local city skyscape or other landmark. Wind speed and direction may be displayed as a graphical overlay in a wind data area of the presentation, e.g., as an animated flag or wind vane blowing with the forecast wind speed and direction. A graphical overlay in the form of a temperature plot may show forecast low to high to low to high temperatures in a line graph format. Thus, as the sun, clouds and precipitation move across the screen in conjunction with the programmed time-line, the meteogram may plot the low and high temperatures. A special text area overlay portion of the presentation may be used for textual warning or watch information or forecast highlights that a user feels important. This will allow television viewers for the first time ever to be able to see the weather before it happens—granted the accuracy of the meteorologist's forecast. The final animation can either be displayed from the Visual Forecast workstation, converted into a Silicon Graphics or other format movie file and aired through another weather computer system, and/or stored for viewing over the Internet.

In order to facilitate the real-time rendering of a photo-realistic three-dimensional visualization, new techniques utilizing fractal technology have been developed. The fractal rendering techniques to be described in more detail below employ a simple physics model to produce realism more efficiently. A multi-dimensional approach is used to enable variations in time. Fractal rendering technology can also be used to augment the textural quality of other elements in the scene, such as mountainous topography, and bodies of water. Fractal techniques can also be used to produce realistic volumetric precipitation events such as rain, snow, and mixed precipitation types with depth information. Lightening may also modeled using these fractal techniques. Well-known forms of fractal technology can also be used for rendering. Caching of similar views aids in rendering. Procedural texturing operations may also be fractal operations. As will be discussed in more detail below, with the new techniques described herein, it is possible to create objects that appear complex. (e.g., clouds, with all their wispy detail), while using a relatively computationally simple procedure to generate these textures. These textures may also be combined in a repetitive way, to create a three-dimensional fractal object, namely the appearance of complex "volumetric" clouds that can be flown through.

In accordance with the present invention, fractal techniques of simple, repetitive operations at many scales, may be used to produce quickly realistic cloud images. An improved and preferred method for generating realistic fractal cloud images in accordance with the present invention incorporates four basic steps. (1) Building a perfectly spherical three-dimensional solid fractal texture using conventional fractal image computer graphics generation techniques. (2) Extracting a large number of thin slices through the spherical solid fractal texture. (3) Building up a volume "cloudlet" as an assembly of these slices, where the slices are constrained to be perpendicular to the direction of viewing. (4) Assembling cloudlets into clouds, depending on the type of cloud. Each of these steps will now be described in greater detail.

A perfectly spherical three-dimensional solid fractal texture is generated using conventional fractal computer graphics generation techniques. This is done only once per visualization.

Figure 6:
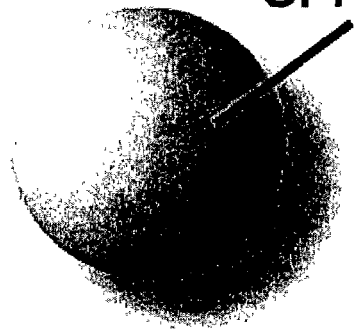
FIGS. 6-8 are exemplary graphical representations of three steps of a fractal cloud rendering technique used to render realistic three-dimensional cloud images for use in a three dimensional weather forecast rendering system and method in accordance with the present invention.

As illustrated in FIG. 6, a large number of thin slices are then extracted through the solid fractal texture. Adjacent slices look similar because local variation is low. However, the adjacent slices are also slightly different in a random "cloudlike" way. Let us call these slices S(1), S(2), ..., S(n). An exemplary procedure for generating these slices is:

// i and j run through the height and width of the slice, and k is an index // that denotes a depth or time aspect. Adjacent slices with adjacent k values // are different, but similar.

// The fractal aspect of the algorithm comes in with the unique calculation of // a "cloud" density at each point by means of a procedural generating routine int i, j, k;

for (j=0; j<height; j++)
{
　for (i=0; i<width; i++)
　{
　for (k=0; k<slices; k++)
　{
　　data[i+j*width+k*width*height]=generate(i, j, k);
　}
　}
}

// At this point, data contains a block of data of a number of slices of cloud textures At this point the slices may be attenuated to make them appear more naturally generated, and to remove the rectangular nature of the textures. For example the slice textures may be attenuated to make them look like circular textures, that fall off towards the edges. This helps to reduce the appearance of the "rectangular" shape of the cloud textures. An exemplary attenuation technique which may be employed follows.

First calculate a distance from any pixel I, j to the center of the texture:

$$r = \sqrt{\left(i - \frac{\text{width}}{2}\right)^2 + \left(j - \frac{\text{height}}{2}\right)^2}$$

Then in terms of the step function:

$$\Theta(x) = \begin{cases} 0, & x < 0 \\ 1, & x > 0 \end{cases},$$

calculate a composite damping factor $\alpha$ and an offset factor $\beta$, in terms of the parameters given by an extinction drop-off factor $\kappa$ and extinction asymptote $\lambda$, and an extinction radius $r_0$, which we divide up into three regimes:

$\alpha_1 = e^{-\kappa(r-\rho_1 r_0)}\Theta(r-\rho_1 r_0) + \Theta(\rho_1 r_0 - r)$ $\beta_1 = (1-\alpha_1)\lambda\Theta(r-\rho_1 r_0)$ $\alpha_2 = e^{-\kappa(r-\rho_2 r_0)}\Theta(r-\rho_2 r_0) + \Theta(\rho_2 r_0 - r)$ $\beta_2 = (1-\alpha_2)\lambda\Theta(r-\rho_2 r_0)$ $\alpha_3 = e^{-2\kappa(r-\rho_3 r_0)}\Theta(r-\rho_3 r_0) + \Theta(\rho_3 r_0 - r)$ $\beta_3 = (1-\alpha_3)\lambda\Theta(r-\rho_3 r_0)$ The parameters $\rho_1, \rho_2, \rho_3$ specify which damping and offset factors work in different regimes, to achieve a realistic looking attenuation effect for the cloud textures. For example, these values could be 1, 1.5 and 2.3 respectively. The composite damping and offset factors $\alpha$ and $\beta$ on an arbitrary value $\eta$ are a combination of the individual damping and offset factors defined above:

$\alpha\eta + \beta = \alpha_3[\alpha_2(\alpha_1\eta + \beta_1) + \beta_2] + \beta_3$ This attenuation procedure may be used as follows:
1. Calculate the values at each point on the rectangular textures using the fractal procedural texture generator given in the code slice above.
2. Normalize the values so that they fall in the range 0-1.
3. Attenuate the values from the center of the texture according to the procedure above.

The only part that remains to define is the procedural texture generator, given by the below exemplary routine "generate". This noise function repetitively accumulates the effects over difference scales, as can be seen by the inner loop. The noise function can be one of any number of multiple implementations.

(This can be done using standard procedural texturing algorithms found in fractal literature.)

float generate(float x, float y, float z)
{
　float value=0;
　for (float f=0.1; f<1; f*=2)

```
{
value+=noise(x*f, y*f, z*f)/f;
}
return value;
}
```

Figure 7:
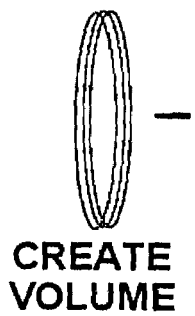

As illustrated in FIG. 7, from the slices obtained by the previous procedures a volume "cloudlet" is built as an assembly of these slices, where the slices are constrained to be perpendicular to the direction of viewing. For example, a particular cloud could be made up of slices S(12), S(43) and S(100). By changing the slices used to S(13), S(44) and S(101) in a subsequent frame, the slices are similar but different and that visually looks like dynamic changes that make clouds look the way they do. The result of this step is a series of cloudlets C(1), C(2), ... C(N). Each cloudlet can change over time, by simply changing the offset of the particular slice S(i+offset modulo n) where i goes from 0 to n. Depending on the type of cloud, these cloudlets can vary from flat to spherical.

Figure 8:
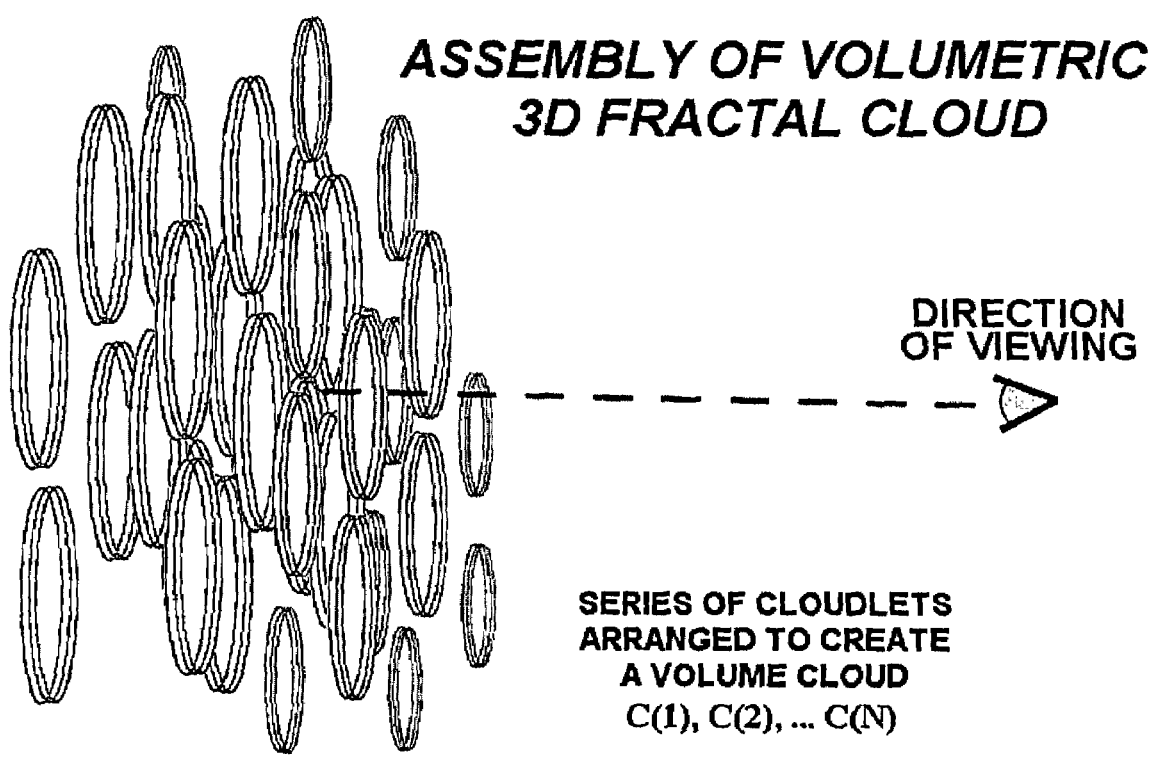

Finally, as illustrated in FIG. 8, the cloudlets are assembled into volume clouds. Layout variations of cloudlet patterns are then used to make the different types of fractal clouds. Alpha blending is used to combine all these components together.

Once the fractal clouds are created, they are placed in the scene using an X,Y,Z,T coordinated system, where X is in degrees of latitude, Y is in degrees of longitude, Z is in kilometers above the surface, and T is time (days, hours, minutes) into the future. The input into the three-dimensional scene can either be done manually by the user or automatically by one of many computer forecast models. Being able to display raw computer forecast model data into the Visual Forecast Workstation scene, enable the user and/or television viewers actually to see the weather before it happens over their own city. The clouds are spaced randomly using a distance density setting, which may be based on a cloud density forecast established by a meteorologist or other user. The sizes of the clouds are based on a size value, e.g., on a kilometer scale as also established by a meteorologist or other user.

It should be understood that the fractal cloud generation technique described and claimed herein may be useful in applications other than the generation of realistic weather forecast representations. Such a technique may be employed in any application wherein realistic cloud images are required or desired, such as flight simulators, video games, and other multi media presentations.

It should be understood that, in general, the present invention is not limited to the particular exemplary embodiments illustrated and described herein, but embraces all such modified forms thereof as come within the scope of the following claims.

What is claimed is:

1. A computer implemented method for generating a realistic dynamic graphical presentation of forecast weather conditions, comprising
   (a) receiving a forecast of weather conditions including forecast cloud conditions;
   (b) generating fractal three-dimensional cloud images corresponding to the forecast cloud conditions by
      (i) generating a spherical three-dimensional solid fractal texture;
      (ii) extracting a plurality of slices through the spherical solid fractal texture;
      (iii) generating a plurality of cloudlets as an assembly of a plurality of the slices; and
      (iv) combining cloudlets into three-dimensional images; and
   (c) automatically generating an animated representation of the forecast weather conditions including the three-dimensional fractal cloud images corresponding to the forecast cloud conditions.

2. The method of claim 1 wherein receiving a forecast of weather conditions includes receiving forecast weather conditions from a user.

3. The method of claim 1 wherein receiving a forecast of weather conditions includes receiving forecast weather conditions from a model of forecast weather conditions.

4. The method of claim 1 comprising additionally the step of attenuating the plurality of slices.

5. The method of claim 4 wherein generating a plurality of cloudlets includes constraining the slices to be perpendicular to a direction of viewing.

6. The method of claim 1 wherein alpha blending is used to combine the slices into cloudlets and the cloudlets into three-dimensional cloud images.

7. A method of for generating fractal three-dimensional cloud images, comprising:
   (a) generating a spherical three-dimensional solid fractal texture;
   (b) extracting a plurality of slices through the spherical solid fractal texture;
   (c) generating a plurality of cloudlets as an assembly of a plurality of the slices; and
   (d) combining cloudlets into three-dimensional cloud images.

8. The method of claim 7 comprising additionally the step of attenuating the plurality of slices.

9. The method of claim 7 wherein generating a plurality of cloudlets includes constraining the slices to be perpendicular to a direction of viewing.

10. The method of claim 7 wherein alpha blending is used to combine the slices into cloudlets and the cloudlets into three-dimensional cloud images.

11. The method of claim 1 wherein automatically generating an animated representation of the forecast weather conditions includes generating an animation of the three-dimensional fractal cloud images and combining the animated three-dimensional fractal cloud images with a landmark image.

12. The method of claim 11 wherein the landmark image is a cityscape image.

13. The method of claim 11 wherein automatically generating an animated representation of the forecast weather conditions includes combining the animated three-dimensional fractal cloud images with a landmark image and an image of photo-realistic terrain.

14. The method of claim 13 comprising additionally generating the image of photo-realistic terrain by combining satellite imagery and elevation data.

15. The method of claim 11 wherein the forecast of weather conditions includes forecast atmospheric effects and comprising additionally generating an animated image of atmospheric effects corresponding to the forecast atmospheric effects and wherein automatically generating an animated representation of the forecast weather conditions includes combining the animated three-dimensional fractal cloud images with the animated image of atmospheric effects and the landmark image.

16. The method of claim 15 wherein the atmospheric effects are selected from the group of atmospheric effects consisting of rain, snow, and fog.

17. The method of claim 15 wherein the animated three-dimensional fractal cloud images, the animated image of atmospheric effects, and the landmark image are generated separately as image layers and wherein automatically generating an animated representation of the forecast weather conditions includes combining the image layers to form the animated representation of the forecast weather conditions.

18. A method of generating fractal three-dimensional images, comprising:
  (a) generating a three-dimensional solid fractal texture;
  (b) extracting a plurality of slices through the solid fractal texture;
  (c) generating a plurality of assemblies of a plurality of the slices; and
  (d) combining the assemblies into three-dimensional images.

19. The method of claim 18 wherein the three-dimensional solid fractal structure is spherical.

20. The method of claim 18 comprising additionally the step of attenuating the plurality of slices.

21. The method of claim 18 wherein generating a plurality of assemblies includes constraining the slices to be perpendicular to a direction of viewing.

22. The method of claim 18 wherein alpha blending is used to combine the slices into assemblies and the assemblies into three-dimensional images.

23. A system for generating a realistic dynamic graphical presentation of forecast weather conditions, comprising
  (a) an input adapted to receive a forecast of weather conditions including forecast cloud conditions;
  (b) a computer processor coupled to the input and adapted to generate fractal three-dimensional cloud images corresponding to the forecast cloud conditions by
    (i) generating a spherical three-dimensional solid fractal texture;
    (ii) extracting a plurality of slices through the spherical solid fractal texture;
    (iii) generating a plurality of cloudlets as an assembly of a plurality of the slices; and
    (iv) combining the cloudlets into three-dimensional images and to generate automatically an animated representation of the forecast weather conditions including the three-dimensional fractal cloud images corresponding to the forecast cloud conditions; and
  (c) an output coupled to the computer processor and adapted to display the animated representation of the forecast weather conditions generated thereby.

24. The system of claim 23 wherein the computer processor is the computer processor of a personal computer.

25. The system of claim 23 wherein the input includes a graphical user interface adapted to receive a forecast of weather conditions from a user.

26. The system of claim 23 wherein the input is adapted to receive a forecast of weather conditions from a model of forecast weather conditions.

27. The system of claim 23 wherein the computer processor is adapted to attenuate the plurality of slices.

28. The system of claim 23 wherein the computer processor is adapted to constrain the slices to be perpendicular to a direction of viewing.

29. The system of claim 23 wherein the computer processor is adapted to use alpha blending to combine the slices into cloudlets and the cloudlets into three-dimensional cloud images.

30. The system of claim 23 wherein the computer processor is adapted to generate automatically an animated representation of the forecast weather conditions by generating an animation of the three-dimensional fractal cloud images and combining the animated three-dimensional fractal cloud images with a landmark image.

31. The system of claim 30 wherein the landmark image is a cityscape image.

32. The system of claim 30 wherein the computer processor is adapted to generate automatically an animated representation of the forecast weather conditions by combining the animated three-dimensional fractal cloud images with a landmark image and an image of photo-realistic terrain.

33. The system of claim 32 wherein the computer processor is adapted to generate the image of photo-realistic terrain by combining satellite imagery and elevation data.

34. The system of claim 30 wherein the input is adapted to receive a forecast of weather conditions including forecast atmospheric effects and wherein the computer processor is adapted to generate an animated image of atmospheric effects corresponding to the forecast atmospheric effects and to generate automatically an animated representation of the forecast weather conditions by combining the animated three-dimensional fractal cloud images with the animated image of atmospheric effects and the landmark image.

35. The system of claim 34 wherein the atmospheric effects are selected from the group of atmospheric effects consisting of rain, snow, and fog.

36. The system of claim 34 wherein the computer processor is adapted to generate the animated three-dimensional fractal cloud images, the animated image of atmospheric effects, and the landmark image separately as image layers and to generate automatically an animated representation of the forecast weather conditions by combining the image layers to form the animated representation of the forecast weather conditions.

* * * * *